(12) United States Patent
Berning et al.

(10) Patent No.: US 10,329,910 B2
(45) Date of Patent: Jun. 25, 2019

(54) SYSTEM AND METHOD FOR THE TRACKING OF MILLING MATERIAL

(71) Applicant: Wirtgen GmbH, Windhagen (DE)

(72) Inventors: Christian Berning, Zuelpich (DE); Christoph Menzenbach, Neustadt (Wied) (DE); Cyrus Barimani, Koenigswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 15/811,734

(22) Filed: Nov. 14, 2017

(65) Prior Publication Data

US 2018/0149021 A1    May 31, 2018

(30) Foreign Application Priority Data

Nov. 25, 2016 (DE) .................. 10 2016 223 454

(51) Int. Cl.
*E01C 23/088* (2006.01)
*E21C 39/00* (2006.01)
(Continued)

(52) U.S. Cl.
CPC ............ *E21C 39/00* (2013.01); *E01C 23/088* (2013.01); *G01B 7/06* (2013.01); *G06Q 10/087* (2013.01);
(Continued)

(58) Field of Classification Search
CPC ............................. E01C 23/088; E01C 23/127
See application file for complete search history.

(56) References Cited

U.S. PATENT DOCUMENTS

| 4,006,936 A | 2/1977 | Crabiel |
| 4,655,634 A | 4/1987 | Loy et al. |

(Continued)

FOREIGN PATENT DOCUMENTS

| AT | 382683 B | 3/1987 |
| CN | 101666622 A | 3/2010 |

(Continued)

OTHER PUBLICATIONS

International Preliminary Report on Patentability in corresponding international application No. PCT/EP2015/055470 dated Sep. 20, 2016, 7 pp. (not prior art).

(Continued)

*Primary Examiner* — Janine M Kreck
(74) *Attorney, Agent, or Firm* — Lucian Wayne Beavers; Gary L. Montle; Patterson Intellectual Property Law, PC

(57) ABSTRACT

In a system for the tracking of milling material, comprising a milling machine for milling a section of a ground pavement in a milling operation, a means of transport which can be loaded with the milling material removed during milling of the section of the ground pavement and which can be used to transport away the removed milling material, a detection device for detecting data signals relating to the milling material, it is provided for the following features to be achieved: the detection device transmits the data signals relating to the milling material to a marking device, and the marking device, depending on the data signals relating to the milling material transmitted, marks the milling material deposited on the means of transport, or the means of transport loaded with the milling material, with a marking means.

21 Claims, 6 Drawing Sheets

(51) Int. Cl.
*G01B 7/06* (2006.01)
*G06Q 10/08* (2012.01)
*E21C 25/10* (2006.01)
*G01V 8/12* (2006.01)

(52) U.S. Cl.
CPC ............... *E21C 25/10* (2013.01); *G01V 8/12* (2013.01); *G05D 2201/0202* (2013.01)

(56) References Cited

U.S. PATENT DOCUMENTS

| | | |
|---|---|---|
| 4,715,657 A | 12/1987 | Sato et al. |
| 4,968,098 A | 11/1990 | Hirsch et al. |
| 4,981,327 A | 1/1991 | Bessinger et al. |
| 6,201,567 B1 | 3/2001 | Kuroda |
| 6,666,521 B1 | 12/2003 | Pease et al. |
| 6,887,013 B2 | 5/2005 | Ley et al. |
| 6,990,390 B2 | 1/2006 | Groth et al. |
| 7,422,391 B2 | 9/2008 | Holl et al. |
| 7,905,682 B2 | 3/2011 | Holl et al. |
| 8,177,871 B2 | 5/2012 | Soma et al. |
| 8,386,196 B2 | 2/2013 | Wagner et al. |
| 8,757,730 B2 | 6/2014 | Wachsmann et al. |
| 8,775,099 B2 | 7/2014 | Wagner et al. |
| 9,121,146 B2 | 9/2015 | Paulsen et al. |
| 2005/0207841 A1 | 9/2005 | Holl et al. |
| 2008/0153402 A1 | 6/2008 | Arcona et al. |
| 2010/0063691 A1 | 3/2010 | Hall et al. |
| 2011/0080034 A1 | 4/2011 | Schnebeck et al. |
| 2011/0307149 A1 | 12/2011 | Pighi et al. |
| 2012/0049607 A1 | 3/2012 | Frederick |
| 2013/0035874 A1 | 2/2013 | Hall et al. |
| 2013/0035875 A1 | 2/2013 | Hall et al. |
| 2013/0080000 A1 | 3/2013 | Von der Lippe et al. |
| 2013/0128279 A1 | 5/2013 | Wachsmann et al. |
| 2014/0116776 A1 | 5/2014 | Marx et al. |
| 2014/0324364 A1 | 10/2014 | Wagner et al. |
| 2015/0149027 A1 | 5/2015 | Paulsen et al. |
| 2015/0197253 A1 | 7/2015 | Zhu |
| 2016/0052731 A1 | 2/2016 | Berning et al. |
| 2016/0187182 A1 | 6/2016 | Beltramin |
| 2016/0194840 A1 | 7/2016 | Berning et al. |
| 2016/0208447 A1 | 7/2016 | Berning et al. |
| 2016/0348324 A1 | 12/2016 | Engelmann et al. |
| 2017/0009408 A1 | 1/2017 | Marsolek et al. |
| 2017/0009578 A1 | 1/2017 | Barimani et al. |
| 2017/0167089 A1* | 6/2017 | Marsolek ............... E01C 19/00 |
| 2017/0205814 A1 | 7/2017 | Marsolek |

FOREIGN PATENT DOCUMENTS

| | | |
|---|---|---|
| CN | 101745874 A | 6/2010 |
| DE | 3136434 A1 | 3/1983 |
| DE | 3411892 A1 | 10/1985 |
| DE | 3218754 C2 | 11/1985 |
| DE | 3504610 A1 | 8/1986 |
| DE | 3505408 A1 | 8/1986 |
| DE | 3616170 A1 | 3/1987 |
| DE | 3818213 A1 | 11/1989 |
| DE | 10015005 A1 | 10/2001 |
| DE | 10203732 A1 | 8/2003 |
| DE | 102005016346 B3 | 1/2007 |
| DE | 102008045470 A1 | 3/2010 |
| DE | 102010014903 A1 | 10/2011 |
| DE | 102013112972 A1 | 5/2015 |
| EP | 697604 A1 | 2/1996 |
| EP | 1039036 A2 | 9/2000 |
| EP | 1396581 B1 | 10/2008 |
| EP | 2887049 A1 | 6/2015 |
| EP | 3115507 A1 | 1/2017 |
| FR | 2610114 A1 | 7/1988 |
| JP | 941863 C | 2/1979 |
| WO | 2015140121 A2 | 9/2015 |
| WO | 2017030778 A1 | 2/2017 |
| WO | 2017125607 A1 | 7/2017 |

OTHER PUBLICATIONS

International Search Report in corresponding international application No. PCT/EP2015/055470 dated Nov. 16, 2015, 5 pp. (not prior art).

Written opinion of International Search Report in corresponding international application No. PCT/EP2015/055470 dated Nov. 16, 2015, 6 pp. (not prior art).

European Search Report of European Patent Application EP 16202024.2, dated Jul. 11, 2017, 11 pp (not prior art).

Caterpillar Operation & Maintenance Manual, PR-1000 Pavement Profiler, Jul. 1990, 78 pages.

ARRA Basic Asphalt Recycling Manual, U.S. Department of Transportation Federal Highway Administration, 108 pages, 2001.

Liang et al., Vision-Based Automatic Tool Wear Monitoring System, Jun. 25-27, 2008, Proceedings of the 7th World Congress on Intelligent Control and Automation, Chongqing, China, pp. 6031-6035.

* cited by examiner

SYSTEM AND METHOD FOR THE TRACKING OF MILLING MATERIAL

CROSS-REFERENCES TO RELATED APPLICATIONS

This application claims benefit of German Patent Application No. 10 2016 223 454.4, filed Nov. 25, 2016, and which is hereby incorporated by reference.

BACKGROUND

The invention relates to a system and a method for the tracking of milling material in accordance with claims as submitted herewith.

Milling machines are known which can be used to mill sections of a ground pavement in a milling operation. Moreover, the milling material removed during milling of the section of the ground pavement is loaded onto a means of transport (transport vehicle), specifically a truck, and transported away. The milling material transported away on the means of transport is deposited on a deposition site. It is known to detect data signals relating to the milling material by means of a detection device. The milling depth and the removed milling volume, for example, are detected in the process.

There is, however, a growing requirement to recycle the removed milling material.

BRIEF SUMMARY

It is therefore an object of the present invention to create a system and a method by means of which the recycling possibilities of the milling material can be improved.

The above mentioned object is achieved by the features of claims as submitted herewith.

The invention advantageously specifies for the detection device to transmit the data signals relating to the milling material to a marking device, and for the marking device, depending on the data signals relating to the milling material transmitted, to mark the milling material deposited on the means of transport, or the means of transport loaded with the milling material, with a marking means.

In this way, the data signals relating to the milling material can be assigned to a milling material.

The means of transport may be, for example, a truck or a tractor provided with a trailer.

The marking means may be suitable for being transported away by the means of transport together with the milling material deposited on the means of transport.

The marking means may be a paint which can be applied on the milling material deposited on the means of transport.

The marking device may apply different paints to the milling material depending on the data signals relating to the milling material.

Depending on the data signals relating to the milling material, it may, for example, be determined as to whether, for example, the milling material contains specific materials. It can thus be determined by means of the detection device as to whether, for example, any materials are contained in the milling material which are classified as hazardous waste. Depending on this, a specific paint can be chosen.

Alternatively, the marking means may be a data storage device provided with marking data.

The data storage device may be an electronic data storage device which the marking data are transmissible to by the marking device.

The marking data may be the data signals relating to the milling material.

Alternatively, the marking device or the detection device may determine the marking data based on the data signals relating to the milling material.

The electronic data storage device may be a transponder or an RFID chip.

The marking device may transmit the marking data to the marking means by means of a wireless connection, with the marking means being the data storage device.

Marking of the milling material may be effected in a continuous process. The entire loaded milling material may, for example, be marked with marking means. Alternatively, marking may also be effected only when the loading process is nearing completion. The transmission of a marking means may, for example, be effected when the truck is almost fully loaded so that merely a single marking means serves to mark the entire loaded material. All intermediate stages are, however, also possible. One marking means each may thus be specified at the beginning or at the end of the loading process or, for example, also per predetermined quantity such as, for example, one marking means per tonne of milling material.

The data signals relating to the milling material may relate to the material properties of the milling material and may specifically be the material of the milling material and/or position data of the milled section of the ground pavement.

Regarding the data signals relating to the material properties of the milling material, these may be data signals which directly describe the material properties of the material, or may be data signals which enable conclusions to be drawn about the material. For the purposes of the invention, the location data of the milled section of the ground pavement may therefore also be data signals relating to the material properties of the milling material. It may be determined, for example, which motorway section is being milled. It may be known which material has been used in the construction of the motorway section so that it can be determined based on the motorway section which material has been used in its construction.

It may be known, for example, which asphalt has been used in the construction, or the composition of the material used in the construction may be known. It may also be known which material has been used in the construction of different layers of the ground pavement. As a rule, the ground pavement comprises a surface layer, a binder layer and a base layer. The known information regarding the material may be stored in a data base (for example, locally on the milling machine or outside of the milling machine), or said information may be entered by an operator of the milling machine. The location data may also be determined based on GPS coordinates. Said data signals relating to the material properties of the milling material may then be detected by the detection device.

Samples of the milled-off material may also be taken, for example, and evaluated immediately or at a later date. For the purposes of the invention, the data signals relating to the material properties of the milling material may also be data signals which relate to the number or the name of such sample.

Material properties of the milling material may be of interest for disposal and recycling. It may be important, for example, that it is known as to whether tar is contained in the milling material, since tar requires separate disposal. Furthermore, knowledge regarding the bitumen proportions in the milling material may be relevant for recycling.

The information from which layer of the road pavement structure the milling material originates may already be of importance as a material property. In the course of a reuse, material from a base layer must, for example, not be used for the production of an asphalt mixture which is to be used as the surface layer in a new road pavement structure. The milling material originating from a surface layer, on the other hand, may be recycled into an asphalt mixture which is used as the base layer in a new road pavement structure.

The data signals relating to the milling material may be operating parameters of the milling machine, or data or data signals, respectively, which are determined by means of the operating parameters, location data or information entered. As a result, both the directly determined or entered data or data signals, respectively, as well as data derived therefrom, may be detected as data signals relating to the milling material. The data derived from the determined or entered data or data signals, respectively, may also represent information on how the milling material is to be marked by the marking device. Information on how the milling material is to be marked by the marking device may, for the purposes of the invention, therefore also be the data signals relating to the milling material.

Operating parameters may specifically be the milling depth, the milling volume removed, the advance speed, the milling drum speed of revolution, the relation between advance speed and milling drum speed of revolution, the milling drum used, the torque/output emitted by the drive engine of the milling machine, or the amount of water fed during the milling process to cool the milling tools. Furthermore, it may be detected as to whether the milling machine is operating in down-milling or in up-milling mode (milling drum rotating in the same direction/in the opposite direction as the ground-engaging units). The data signals relating to the milling material may also be the mass and/or volume of the milling material loaded onto the truck.

Data or data signals may be determined by means of said operating parameters. These may be material properties of the milling material such as, for example, the grain size distribution in the milling material, fine fractions/coarse fractions. The physical properties may be derived from, for example, the relation between the advance rate and the milling drum speed of revolution, or the milling drum used.

Furthermore, it may be determined from the operating parameters, for example, from the milling depth, which layer of the ground pavement has been milled. The ground pavement comprises, for example, a surface layer, a binder layer and a base layer which, as a rule, feature different layer thicknesses. In addition to the milling depth, location data detected by the milling machine may also be taken into account, for example, to determine as to whether milling has already been performed in a specific position. This information can be correlated to allow for more accurate conclusions to be drawn about the layer just milled.

According to the present invention, a method for the tracking of milling material may be specified which comprises the following steps:
 milling a section of a ground pavement with a milling machine in a milling operation,
 detecting data signals relating to the milling material in a detection device,
 depositing the milling material milled during the milling operation on a loading surface of a means of transport.

It is advantageously specified for the data signals relating to the milling material to be transmitted by the detection device to a marking device and, depending on the data signals relating to the milling material transmitted, for the milling material deposited on the means of transport, or the means of transport loaded with the milling material, to be marked by the marking device with a marking means.

The means of transport may be, for example, a truck or a tractor provided with a trailer.

The marking means may be transported away by the means of transport together with the milling material deposited on the means of transport.

The marking means may be a paint or a data storage device.

BRIEF DESCRIPTION OF THE SEVERAL VIEWS OF THE DRAWINGS

In the following, embodiments of the invention are explained in more detail with reference to the drawing.

The following is shown schematically.

DETAILED DESCRIPTION

Figure 1:
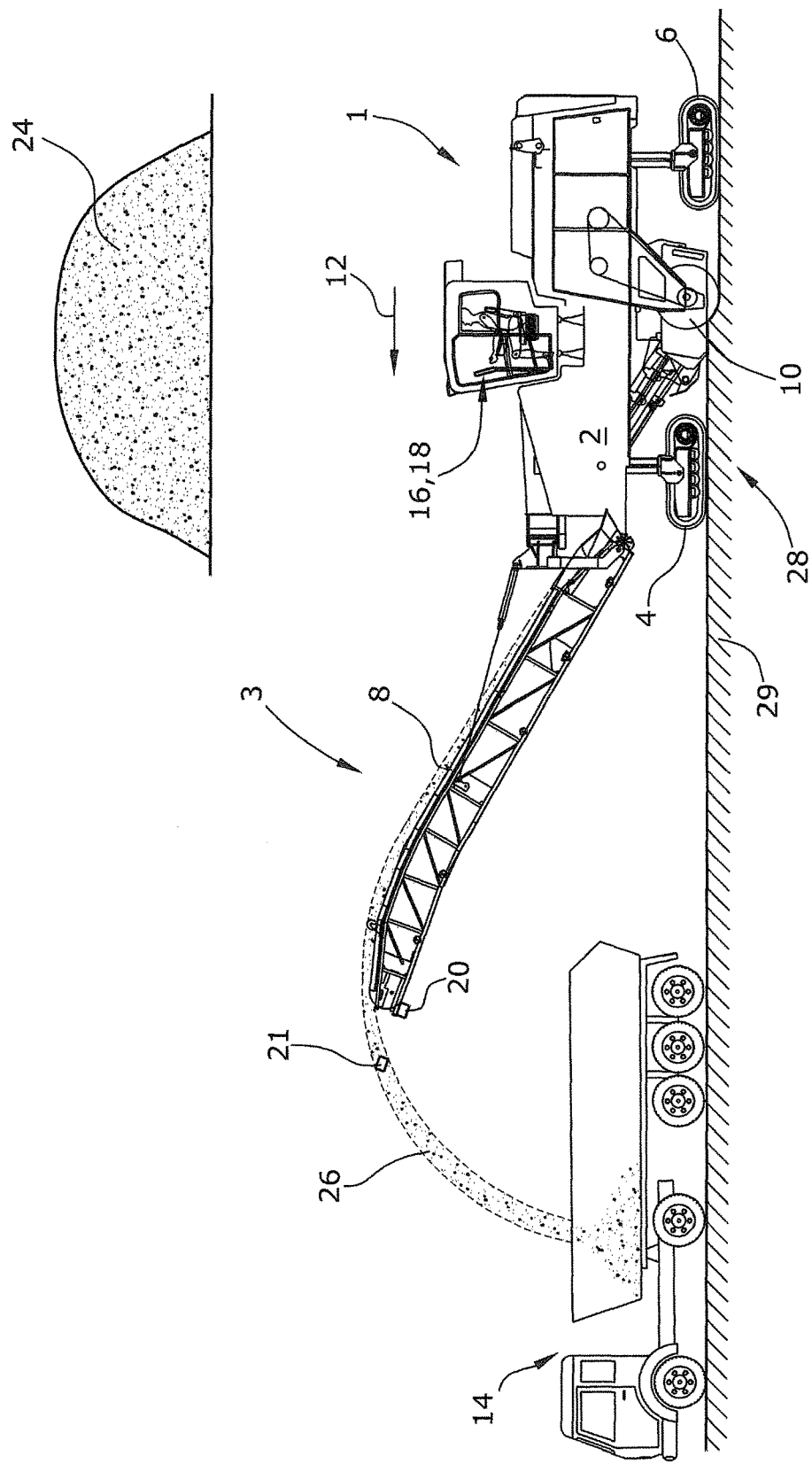
FIG. 1 represents a system for the tracking of milling material.
Figure 2:
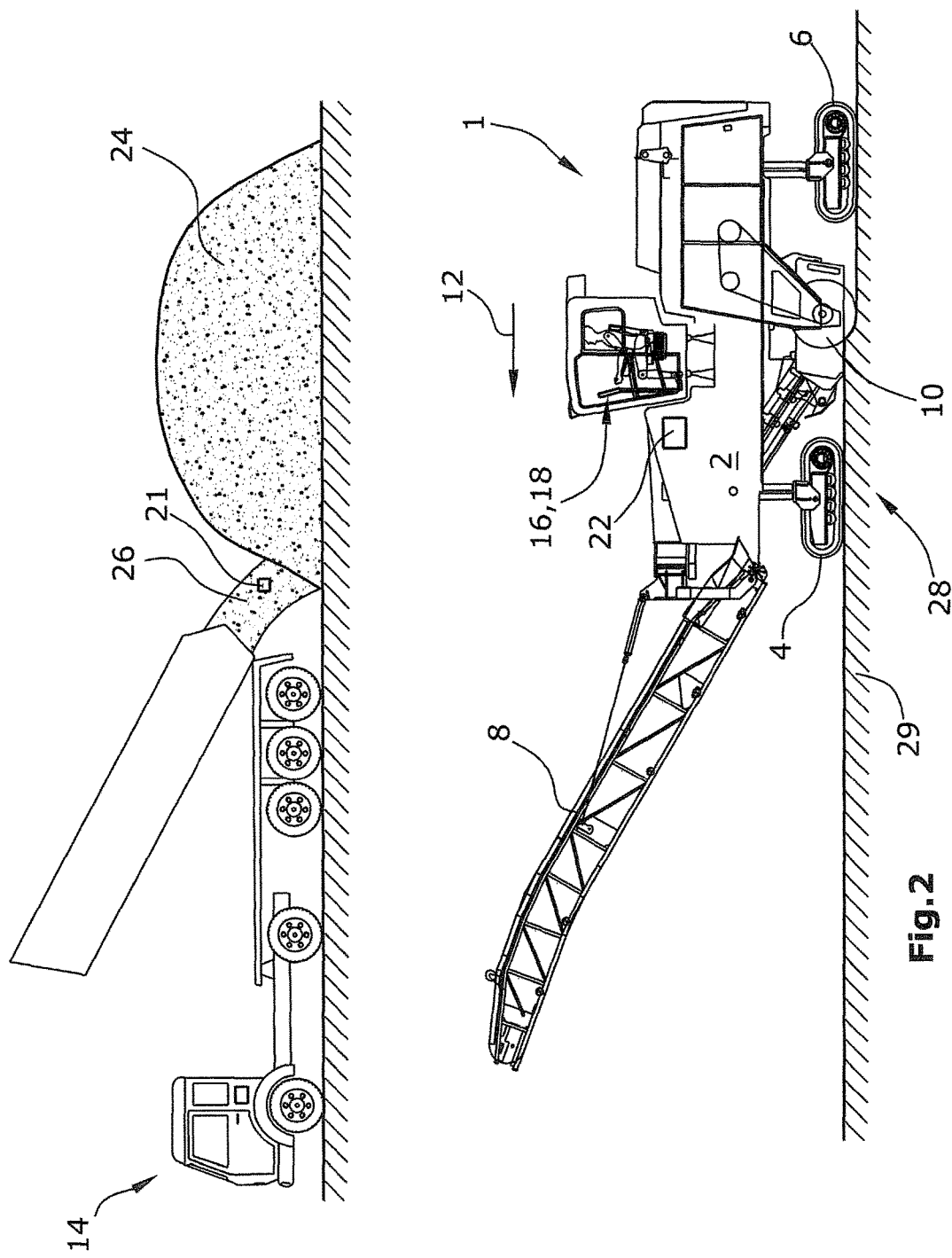
FIG. 2 represents an embodiment according to FIG. 1 with a means of transport at the deposition site.

A system 3 for the tracking of milling material is depicted in FIG. 1. The system 3 comprises a milling machine 1 for milling a section 28 of a ground pavement 29 in a milling operation. The ground pavement 29 is milled by means of the milling machine 1, and the removed milling material 26 is loaded, via no less than one transport belt 8, onto a means of transport designed in the present embodiments as a truck 14. As is depicted in FIG. 2, the milling material 26 loaded onto the truck 14 may be deposited on a deposition site 24.

The milling machine 1 may comprise, as a minimum, a machine frame 2. Furthermore, the milling machine comprises a height-adjustable milling drum 10 for working the ground pavement 29 where, in a milling operation, the milling drum 10 works the ground pavement 29. The milling drum 10 is driven by a drive unit. The drive unit is preferably a drive motor, specifically, a combustion engine. The milling machine 1 comprises front and rear travelling devices 4, 6 as seen in the direction of operation 12. Said travelling devices 4, 6 may be wheels or tracked ground-engaging units. The travelling devices 4, 6 may be connected to the machine frame 2 via lifting columns. The milling machine 1 or the machine frame 2, respectively, can be adjusted in height relative to the ground pavement 29 by means of the lifting columns. The machine frame 2 is adjusted in height by adjusting the lifting columns, and as a result, the milling drum 10 mounted in the machine frame 2 is adjusted in height as well. Alternatively or additionally, the milling drum 10 may be adjustable in height relative to the machine frame 2.

A detection device 18 is depicted by means of which data signals relating to the milling material can be detected. In the embodiment depicted, the detection device 18 is arranged at the milling machine 1. The detection device 18 may detect data signals relating to the milling material. These may, for example, be operating parameters of the milling machine 1, or data or data signals, respectively, which are determined by means of the operating parameters.

Operating parameters may be the milling depth, the milling volume removed, the milling depth, the advance speed, the milling drum speed of revolution, the relation between advance speed and milling drum speed of revolution, the milling drum used, the torque/output emitted by the drive engine of the milling machine, or the amount of water added. Furthermore, it may be detected as to whether the milling machine is operating in down-milling or up-milling mode. Based on said operating parameters, the quantity or the volume or mass, respectively, of the removed milling material can be determined, or conclusions can indirectly be drawn about the material properties of the milling material. Said material properties or data determined can be detected as data signals relating to the milling material.

Also, the detection device 18 may detect further material properties of the milling material not determinable on the basis of the operating parameters as data signals relating to the milling material. The location data of the milled section 28 of the ground pavement 29 may, for example, be detected. It may be known which material has been used in the construction of said section 28 so that conclusions can be drawn about the material based on the location data. Additionally or alternatively, material properties of milling material may be entered or stored, respectively, so that the detection device 18 can detect said material properties of the milling material.

Information regarding the layer of the ground pavement 29 just milled may also be derived from the operating parameters of the milling machine 1 or entered. Said derived or entered information can be detected as data signals relating to the milling material.

The detection device 18 may detect the operating parameters via the control device 16 of the milling machine 1. The detection device 18 may also be arranged externally from the milling machine 1.

The system 3 for the tracking of milling material furthermore comprises a marking device 20. The detection device 18 transmits the data signals relating to the milling material to the marking device 20. The marking device 20 marks, depending on the data signals relating to the milling material transmitted, the milling material 26 deposited on the truck 14, or the truck 14, with a marking means 21.

The marking means 21 may be a data storage device. Marking data may be transmitted to the data storage device. The marking data may be the data signals relating to the milling material, or may be data which are determined based on the data signals relating to the milling material. As has already been described, specific materials can be determined on the basis of the data signals relating to the milling material. Said materials may be transmitted as marking data, for example, to the marking means 21 designed as a data storage device. Alternatively, a term derived therefrom, for example, such as, for example, "special waste", may also be transmitted to the marking means 21. It is, however, also possible, for example, to transmit merely a specific number. In a documentation device not depicted, the data signals relating to the milling material can then be stored in such a fashion that they can, for example, be assigned to said number.

Figure 3:
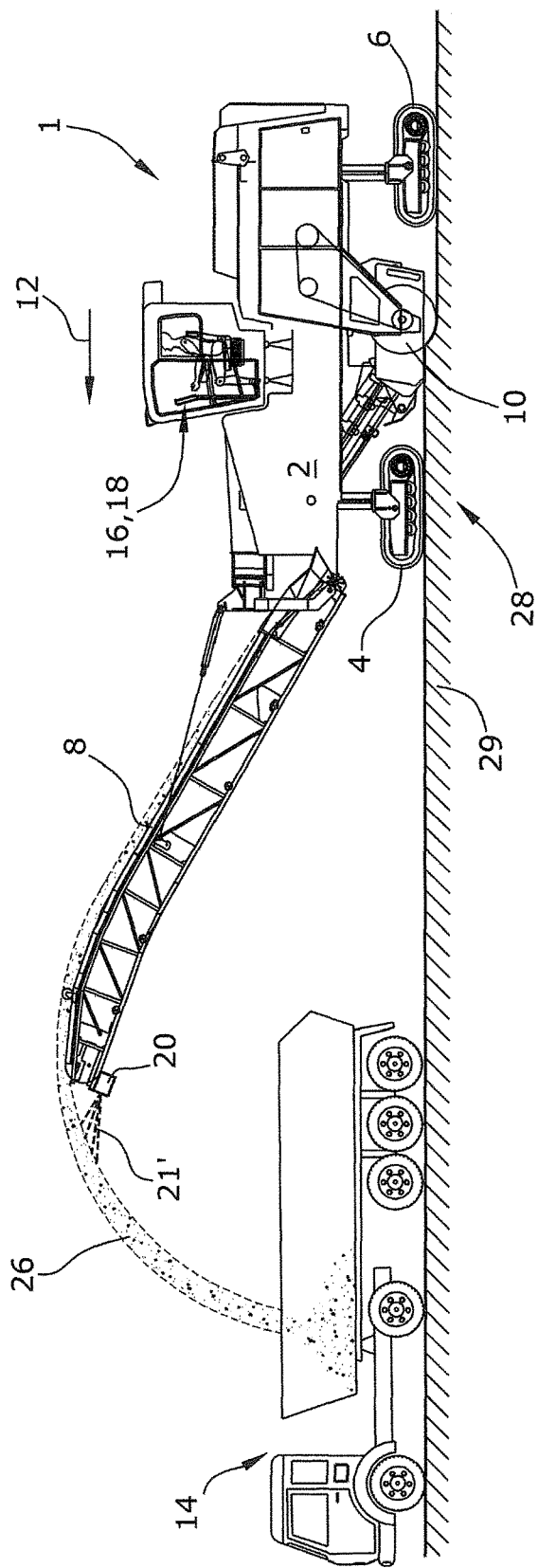
FIG. 3 represents an alternative embodiment of a tracking system.

An alternative embodiment is depicted in FIG. 3. In the embodiment according to FIG. 3, the marking device 20 marks the milling material 26 deposited on the truck 14 with a marking means 21'. In the embodiment depicted, the marking means 21' may be a paint. The marking device 20 may apply different paints to the milling material 26 depending on the data signals relating to the milling material.

Figure 4:
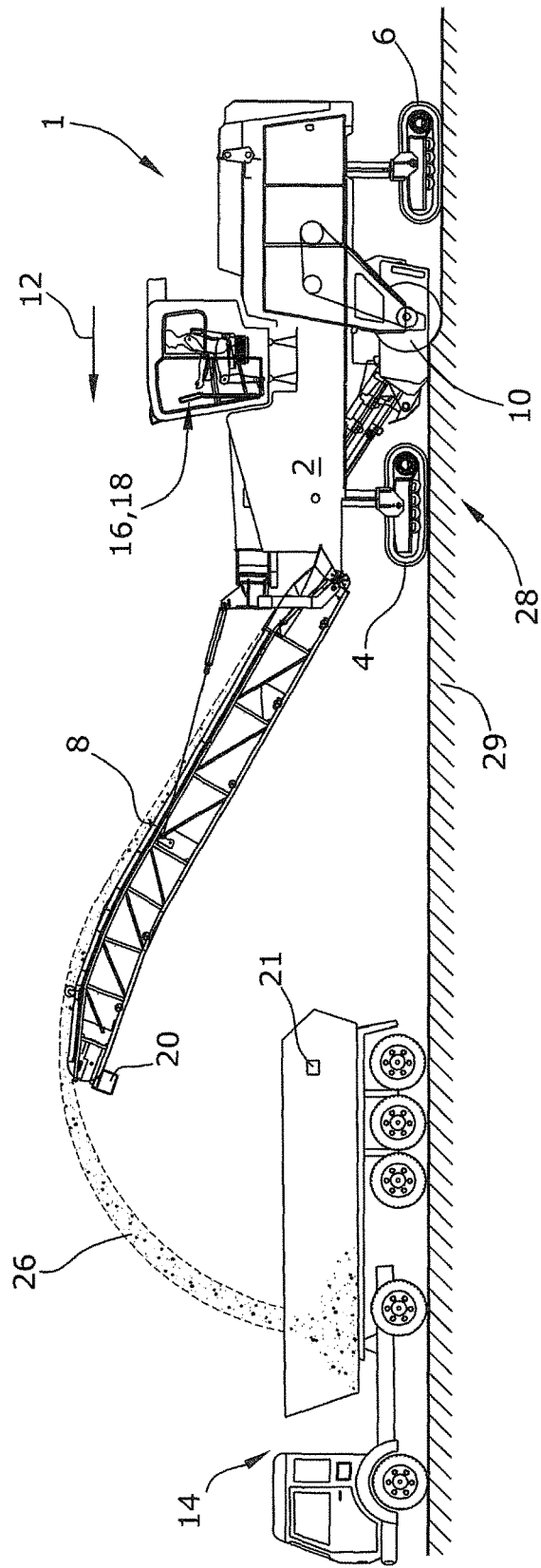
FIG. 4 represents a further alternative embodiment.

A further alternative embodiment is depicted in FIG. 4. In the embodiment depicted, the truck comprises a data storage device. The marking device 20 transmits marking data to the data storage device. By transmitting the marking data to the data storage device, the data storage device becomes a marking means 21. The truck 14 loaded with the milling material is thus marked with a marking means 21. The marking means 21 can be read out, for example, when the truck 14 drives to a disposal site.

The marking device 20 may also, for example, be a printer and, depending on the data signals relating to the milling material, print specific information on a sheet of paper. Said sheet of paper may constitute a marking means, where the marking means can be sent along with the truck 14 loaded with the milling material, thus marking the truck 14 loaded with the milling material.

Figure 5:
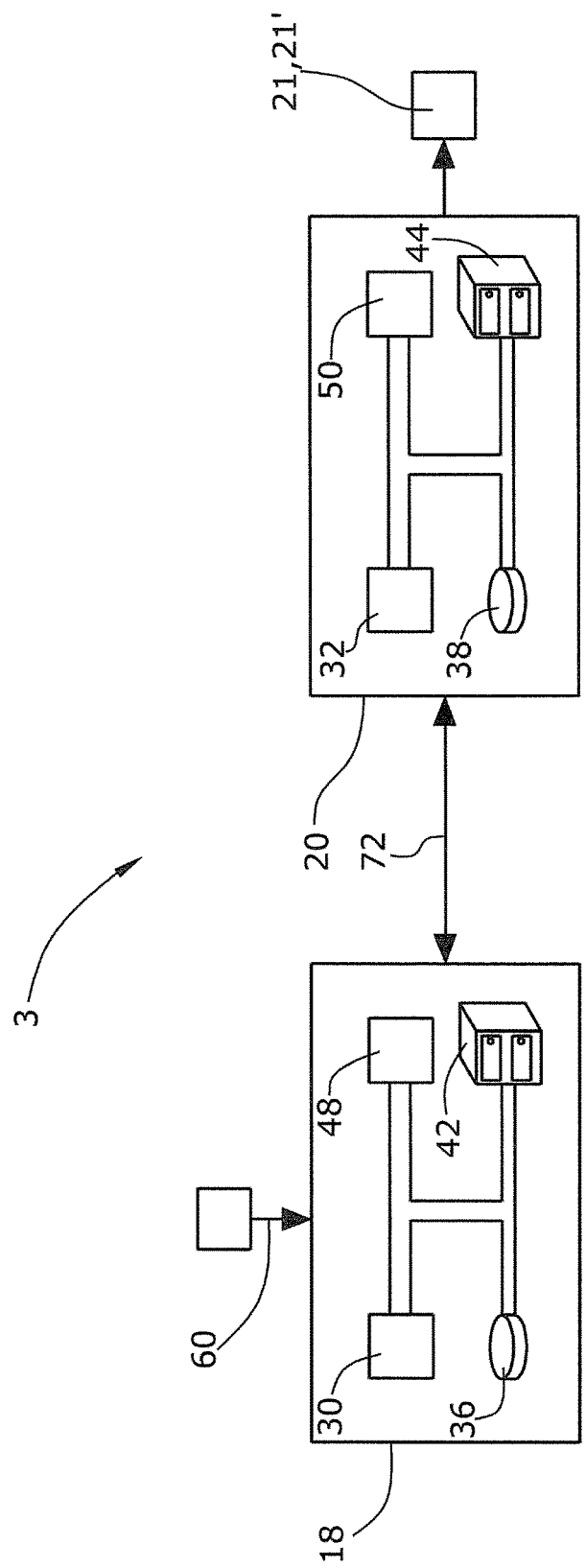
FIG. 5 represents a further alternative embodiment.

The detection device 18, as well as the marking device 20, is depicted in FIG. 5. The detection device 18 as well as the marking device 20 may be computer systems. Said computer systems may comprise processors 30, 32 and/or computer-readable memories 36, 38 and/or data bases 42, 44. The detection device and/or the marking device 20 may also comprise a user interface 48, 50.

The detection device 18 may detect data signals 60. The data signals 60 may be detected from the control device 16 or may also be entered. Alternatively, the detection device 18 may also directly receive the data signals 60 from sensors of the milling machine 1. From the data signals 60, the detection device 18 may determine the data signals relating to the milling material. If the data signals 60 include, for example, the milling drum speed of revolution and the advance speed of the milling machine, said data signals 60 can be correlated with a grain size distribution of the milling material by means of the processor 30 and/or the data base 42. If the data signals 60 include GPS coordinates that are representative for the section 28 of the ground pavement just milled, the material properties of the material present in said section 28 may be stored in the data base 42. The detection device 18 may transmit the data or data signals determined to the marking device 20 via a data connection 72. Alternatively or additionally, the data signals 60 may be transmitted to the marking device 20 as data signals relating to the milling material. The marking device 20 may, depending on the data signals relating to the milling material, mark the milling material deposited on the truck 14, or the truck loaded with the milling material, with a marking means 21, 21'.

The marking device 20 may choose the marking means 21, 21' depending on the data signals relating to the milling material. If the marking means 21, 21' is a data storage device, the marking device 20 may, depending on the data signals relating to the milling material, transmit specific marking data to the marking means 21. It can thus be tracked which milling material is transported away on the respective truck.

The detection device 18 and the marking device 20 may also be designed as a single unit.

Figure 6:
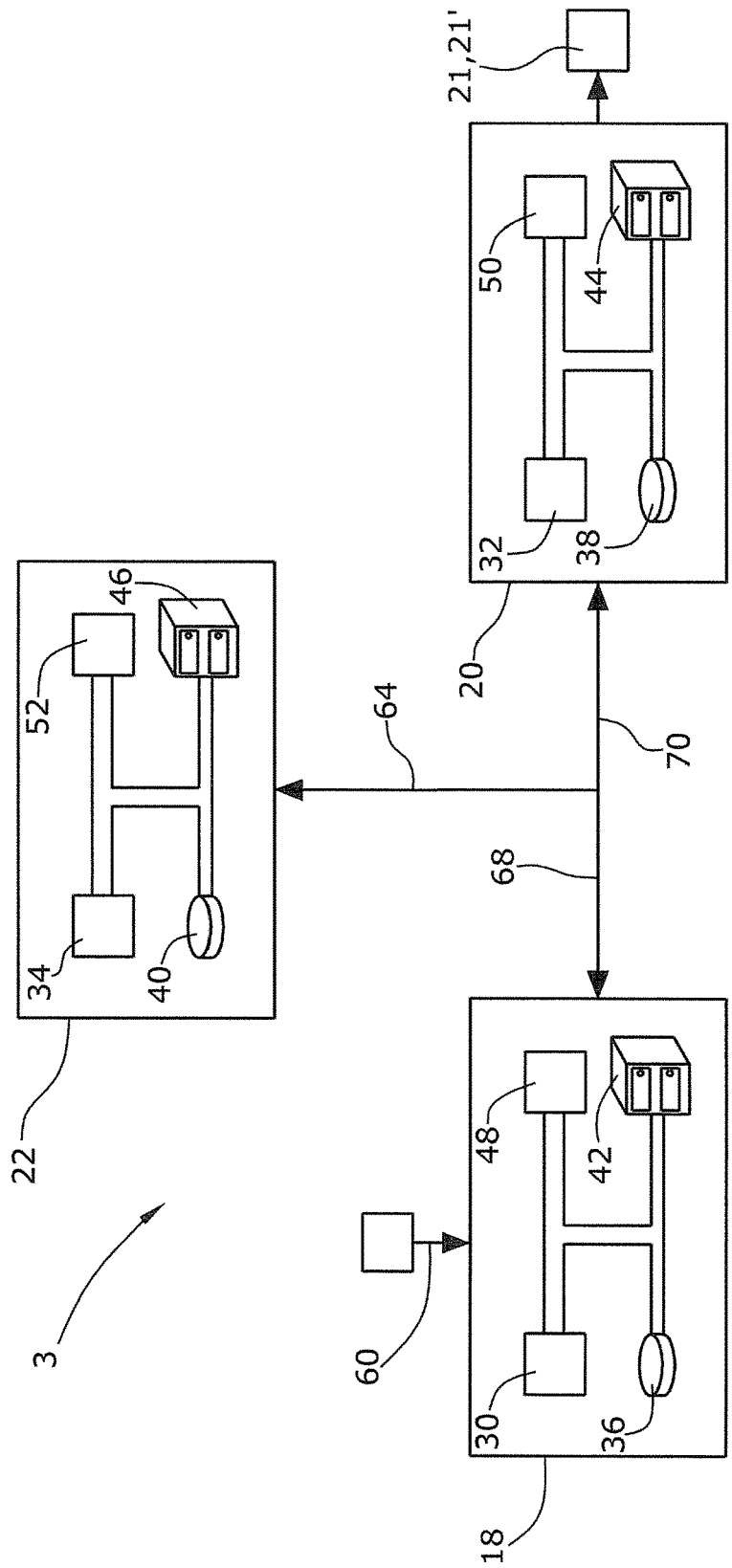
FIG. 6 represents a further alternative embodiment.

A further embodiment is depicted in FIG. 6. Said embodiment is different from FIG. 5 in that a documentation device 22 is specified. The data signals relating to the milling material may be stored in said documentation device 22. Also, information may be stored from the marking device 20 as to which marking means 21, 21' has been used to mark the respective deposited milling material. Said information regarding the marking means and the data signals relating to the milling material may be interlinked in the documentation device 22.

The documentation device 22 may also comprise a processor 34 and/or a computer-readable memory 40 and/or a data base 46 and/or an TO platform or module 52 which typically comprises a user interface.

What is claimed is:

1. A system for the tracking of milling material, comprising:
   a milling machine configured to mill a section of a ground pavement in a milling operation;
   a transport vehicle configured to be loaded with milling material removed during milling of the section of the ground pavement and to transport away the removed milling material;
   a detection device configured to detect data signals relating to the milling material, and to transmit the data signals relating to the milling material to a marking device; and
   the marking device configured
      to mark the milling material deposited on the transport vehicle, the marking of the milling material depending on the data signals relating to the milling material, or
      to mark the transport vehicle loaded with the milling material, the marking of the transport vehicle depending on the data signals relating to the milling material.

2. The system of claim 1, wherein the marking device is configured to mark the milling material by applying a paint on the milling material deposited on the transport vehicle.

3. The system of claim 2, wherein the marking device applies different paints to the milling material depending on the data signals relating to the milling material.

4. The system of claim 1, wherein the marking device is configured to mark a data storage device on the transport vehicle with marking data.

5. The system of claim 4, wherein the data storage device is an electronic data storage device which the marking data can be transmitted to by the marking device.

6. The system of claim 5, wherein the marking data are the data signals relating to the milling material.

7. The system of claim 5, wherein the marking device or the detection device determine the marking data based on the data signals relating to the milling material.

8. The system of claim 5, wherein the electronic data storage device is a transponder or an RFID chip.

9. The system of claim 5, wherein the marking device transmits the marking data to the data storage device by means of a wireless connection.

10. The system of claim 1, wherein the data signals relating to the milling material relate to material properties of the milling material, comprising the material of the milled section of the ground pavement.

11. The system of claim 1, wherein the data signals relating to the milling material relate to position data of the milled section of the ground pavement.

12. The system of claim 1, wherein the data signals relating to the milling operation are operating parameters of the milling machine, specifically, the milling depth or the milling volume removed.

13. A method for the tracking of milling material, comprising:
   milling a section of a ground pavement with a milling machine in a milling operation;
   depositing the milling material milled during the milling operation on a loading surface of a transport vehicle;
   detecting data signals relating to the deposited milling material via a detection device; and
   marking with a marking means the milling material deposited on the transport vehicle, the marking of the milling material depending on the data signals relating to the deposited milling material, or
   marking with a marking means the transport vehicle loaded with the milling material, the marking of the transport vehicle depending on the data signals relating to the milling material.

14. The method of claim 13, wherein the marking means is transported away by the transport vehicle together with the milling material deposited on the transport vehicle.

15. The method of claim 13, wherein the marking means is a paint applied to the milling material deposited on the transport vehicle.

16. The method of claim 15, wherein different paints are applied to the milling material depending on the data signals relating to the milling material.

17. The method of claim 13, wherein the marking means is a data storage device associated with the transport vehicle and provided with marking data.

18. The method of claim 17, comprising transmitting the marking data to the data storage device by means of a wireless connection.

19. The method of claim 13, wherein the data signals relating to the milling material relate to the material properties of the milling material, and comprise the material of the milled section of the ground pavement.

20. The method of claim 13, wherein the data signals relating to the milling material relate to position data of the milled section of the ground pavement.

21. The method of claim 13, wherein the data signals relating to the milling operation are operating parameters of the milling machine, specifically, the milling depth or the milling volume removed.

* * * * *

UNITED STATES PATENT AND TRADEMARK OFFICE
CERTIFICATE OF CORRECTION

| | |
|---|---|
| PATENT NO. | : 10,329,910 B2 |
| APPLICATION NO. | : 15/811734 |
| DATED | : June 25, 2019 |
| INVENTOR(S) | : Christian Berning, Christoph Menzenbach and Cyrus Barimani |

It is certified that error appears in the above-identified patent and that said Letters Patent is hereby corrected as shown below:

In the Specification

Column 7, Line 3 - Replace the letters "TO" with the letters --IO--.

Signed and Sealed this
Twenty-seventh Day of August, 2019

Andrei Iancu
*Director of the United States Patent and Trademark Office*